Figure 1:
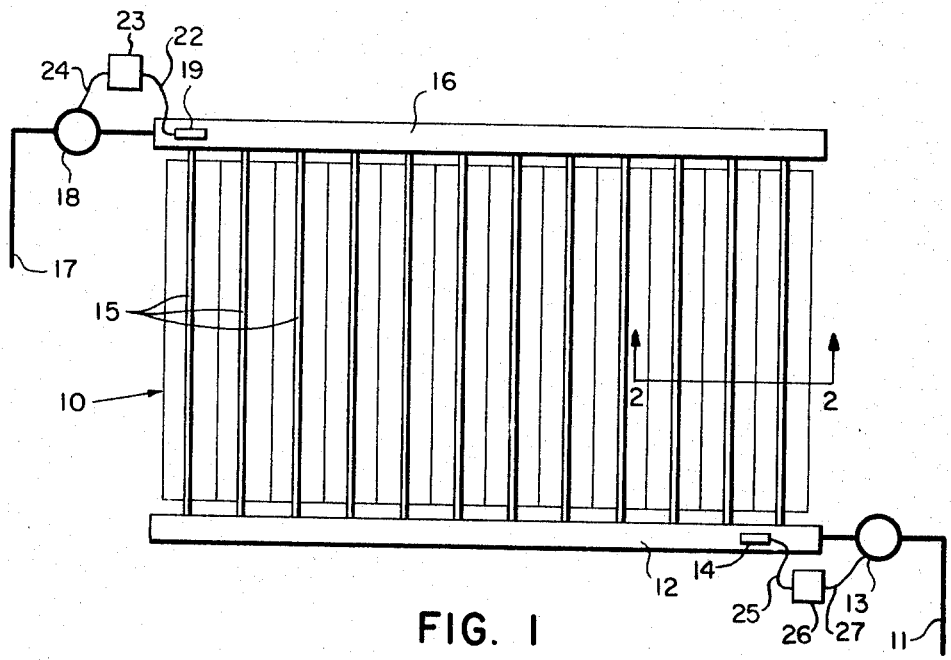

May 23, 1967     D. E. HERVEY     3,321,012

SOLAR HEAT EXCHANGER

Original Filed May 20, 1963

DAVID E. HERVEY
*INVENTOR.*

BY John J. Willett

ATTORNEY

United States Patent Office 3,321,012
Patented May 23, 1967

3,321,012
SOLAR HEAT EXCHANGER
David E. Hervey, Elm City, N.C., assignor to Industrial Institution International, Ltd., Elm City, N.C.
Original application May 20, 1963, Ser. No. 281,629, now Patent No. 3,262,493, dated July 26, 1966. Divided and this application Apr. 4, 1966, Ser. No. 539,948
2 Claims. (Cl. 165—40)

This is a division of my co-pending application, Ser. No. 281,629, filed May 20, 1963, and now Patent No. 3,262,493, and relates to heat-exchanging devices and more particularly to devices adapted to selectively, in the alternate, collect heat and dissipate cold or collect cold and dissipate heat.

Heretofore, heat exchangers, particularly of the type adapted to collect cold or heat, have been constructed either with a series of tubes imbedded in a flat reflective surface or have comprised a curved or semi-cylindrical reflector with a round tube mounted at approximately its focal point. Relative to this latter form of the prior art, fins or vanes have been mounted about the tube in an effort to obtain more efficiency from the unit.

Even at best, the prior art heat exchangers have been extremely inefficient even to the point where it is necessary to incorporate thereinto an elaborate system of gears and racks or other means to shift or otherwise change the position of the exchange or collector unit so that its relative position to the source of heat will remain constant.

Applicant, on the other hand, after much research and study has developed and designed a very efficient heat-exchange device for collecting solar radiations as well as cold from natural climatic conditions. This invention consists of a flattened tube so mounted within a semi-cylindrical reflector that each ray of solar radiation will fall upon the tube either directly or by reflection. This collection of each ray of radiation falling upon the device is inherent in its design and, therefore, eliminates the necessity of mechanical or other means of maintaining a pre-defined relationship between the source of radiations and the collector.

It is, therefore, an object of the present invention to provide a heat-exchange means which is extremely efficient in its collection of solar radiations.

Another object of the present invention is to provide a heat-exchange means for collecting solar radiations and cold from natural climatic conditions which does not require a shifting of positions in order to operate at top efficiency.

Another object of the present invention is to provide a solar energy collector having flattened heat-fluid-transfer tubes cooperatively associated with a generally semi-cylindrical reflector means to increase the efficiency of collecting and dissipating energy.

A further object of the present invention is to provide a solar energy collecting means comprising at least one semi-cylindrical reflector having a flattened fluid-heat-transfer tube mounted longitudinally in the radial plane perpendicular to the chord defining the extremities of the arc of said reflector.

Another object of the present invention is to provide a heat-exchange means which is extremely inexpensive to manufacture and install.

Other objects and advantages of the present invention will become apparent and obvious from a study of the following description and the accompanying drawings which are merely illustrative of the present invention.

Figure 2:
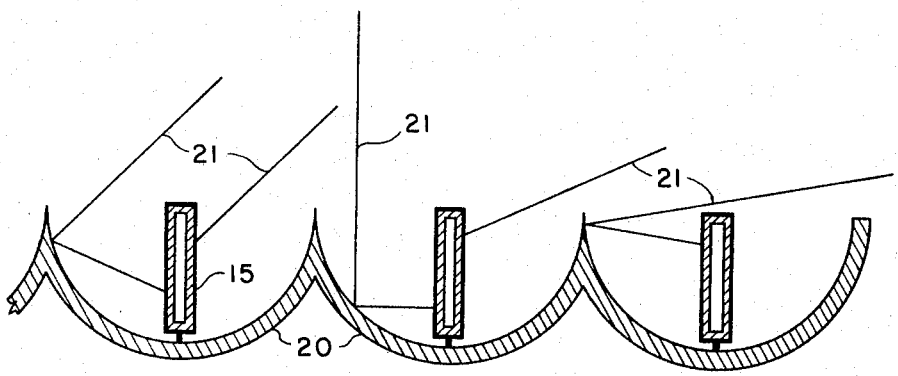

In the drawings:

FIG. 1 is a plan view of the collector; and
FIG. 2 is a cross-section of lines 2—2 of FIG. 1.

With further reference to the drawings, FIG. 1 discloses a heat-exchange unit 10 having a flow-line 11 entering a manifold 12 by way of fluid circulator 13. Within said manifold 12 is a sensing probe 14 which is operatively connected to fluid circulator 13 by electrical circuits (not shown).

The manifold 12 is communicatively connected to fluid-bearing tubes 15 in such a manner that a heat-exchange fluid passing through flow-line 11 and into manifold 12 may then pass into said tubes.

When the heat-transfer fluid within said tubes 15 reaches a pre-determined temperature level, as will be discussed in more detail hereinafter, the fluid is forced into a second manifold 16; and exits through a second flow-line 17 by way of a second flow circulator 18.

A second sensing probe 19 is located within said manifold 16 in a similar manner to the probe 14 mounted within manifold 12.

FIG. 2, which is a cross-section of lines 2—2 of FIG. 1, clearly discloses the relationship of the semi-cylindrical reflector 20 of the flattened tubes 15. This figure also discloses the manner in which the tubes collect either heat from solar radiations or cold from natural climatic conditions as exemplified by radiation lines 21.

As is readily apparent from the cross-section disclosed in FIG. 2, the flattened fluid-bearing tubes 15 are mounted in a plane defined by the radius which is perpendicular to the chord extending from the extremities of the arc of the curved reflector.

It might also be noted that it has been found advantageous to coat the tubes 15 with a heat receptive color such as dark brown or soot black to aid in the absorption of radiations.

In operation the present invention may be used, for example, in conjunction with a structure heating and cooling system such as that disclosed in my co-pending application hereinbefore referred to. When it is desired to collect solar radiations and to transfer the heat thereby accumulated, the heat-transfer fluid within the manifold tubes 15 will rise to a pre-determined temperature of, for example, 180°. Upon reaching the pre-determined temperature, the sensing probe or aquistat 19 with capillary 22 activates electric switch 23 which in turn will activate the fluid circulator 18 by way of electrical line 24 to cause the heat-transfer fluid to pass into the system through flow-line 17. Since cool fluid will be entering from the system through line 11 and manifold 12, sensing probe 19 will automatically shut down circulator 18 upon reaching a pre-determined low temperature.

When it is desired to collect cold from the natural climatic condition, sensing probe or aquistat 14 is set at a pre-determined point, for example, 35°. This probe will activate fluid circulator 13 by way of capillary 25, electrical switch 26 and electric line 27 upon realization of the pre-determined temperature thereby causing fluid flow from the collector 10 through flow line 11 into the system. Upon the reaching of a pre-determined high temperature, probe 14 will automatically stop the circulation of fluid by shutting off fluid circulator 13.

It will thus be seen that the collector embodied in the present invention may collect either heat or cold depending on pre-determined temperatures selected to control the operation of the device. It will likewise be obvious that there are substantial improvements in the design of the present heat exchanger over that disclosed by the prior art.

The present invention may be carried out in other specific ways than those herein set forth without departing from the spirit and essential characteristics of invention. The present embodiments are, therefore, to be considered in all respects as illustrative and not restrictive; and all changes coming within the meaning and equivalency range of the appended claims are intended to be embraced herein.

What is claimed is:
1. An improved heat-exchange means comprising at least one fixed semi-cylindrical reflector, at least one flattened fluid-bearing tube any lateral cross-section of which has a major and minor axis, said tube being longitudinally mounted within said reflector and disposed so that the major axes of said tube cross-section lie within the radial plane perpendicular to the chord of the extremities of the arc formed by a lateral cross-section of said reflector, and means for passing a temperature-conducting fluid through said tube whereby heat and cold alternately may be collected and transferred.

2. The heat-exchange means of claim 1 wherein a means is provided for setting a pre-determined temperature at which said fliud will collect and transfer said heat and cold.

References Cited by the Examiner
UNITED STATES PATENTS

| | | | |
|---|---|---|---|
| 2,692,961 | 10/1954 | Fondiller | 165—40 X |
| 2,762,569 | 9/1956 | Caillol. | |
| 3,227,153 | 1/1966 | Godel et al. | 126—271 |

MEYER PERLIN, *Primary Examiner.*

ROBERT A. O'LEARY, *Examiner.*

N. R. WILSON, M. A. ANTONAKAS,
*Assistant Examiners.*